United States Patent
Burmak et al.

(10) Patent No.: US 12,477,204 B2
(45) Date of Patent: Nov. 18, 2025

(54) DEVICE AND METHOD FOR GATHERING IMAGE SETS

(71) Applicant: SAMSUNG ELECTRONICS CO., LTD., Suwon-si (KR)

(72) Inventors: Liudmila Igorevna Burmak, Moscow (RU); Petr Pohl, Moscow (RU); Xenya Iurevna Petrova, Moscow (RU); Imran Kazbekovich Navruzbekov, Moscow (RU); Alexey Viktorovich Kliuev, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 18/371,239

(22) Filed: Sep. 21, 2023

(65) Prior Publication Data

US 2024/0137631 A1 Apr. 25, 2024
US 2024/0236458 A9 Jul. 11, 2024

(30) Foreign Application Priority Data

Oct. 20, 2022 (RU) .......................... RU2022127272

(51) Int. Cl.
*G06T 3/40* (2024.01)
*G02B 5/20* (2006.01)
(Continued)

(52) U.S. Cl.
CPC .............. *H04N 23/55* (2023.01); *G02B 5/20* (2013.01); *G06T 3/40* (2013.01); *G06T 15/00* (2013.01);
(Continued)

(58) Field of Classification Search
CPC ........ H04N 23/15; H04N 23/16; H04N 23/45; H04N 23/695; H04N 23/90; H04N 23/951; G06T 3/4053
(Continued)

(56) References Cited

U.S. PATENT DOCUMENTS 6,533,420 B1 3/2003 Eichenlaub
7,329,860 B2 2/2008 Feng et al.
(Continued)

FOREIGN PATENT DOCUMENTS

CN 1575436 A 2/2005
CN 101361015 A 2/2009
(Continued)

OTHER PUBLICATIONS

Hamid Reze Vaezi Joze et al., "ImagePairs: Realistic Super Resolution Dataset via Beam Splitter Camera Rig," arXiv:2004.08513v1 [eess.IV] Apr. 18, 2020 [Total 11 pages].
(Continued)

*Primary Examiner* — Anthony J Daniels
(74) *Attorney, Agent, or Firm* — Sughrue Mion, PLLC (57) ABSTRACT

A device for gathering image sets includes: N digital cameras including one or more ground truth cameras for capturing high quality ground truth images and one or more target cameras for capturing low quality target images, the N digital cameras being optically coupled via N−1 beam splitters, at least N−1 cameras of the N digital cameras being mounted on automatically adjustable mounts; and at least one computer readable storage device storing instructions executable by at least one processor. The instructions cause the at least one processor to adjust the at least N−1 cameras by actuating the automatically adjustable mounts on which the at least N−1 cameras are mounted; synchronize image capture by the digital cameras; and control the digital
(Continued)

cameras to gather sets of N images. The at least N−1 cameras are adjusted based on at least one set of N images of the scene.

20 Claims, 6 Drawing Sheets

(51) Int. Cl.
    *G06T 15/00*     (2011.01)
    *G06V 10/25*     (2022.01)
    *G06V 10/56*     (2022.01)
    *H04N 23/45*     (2023.01)
    *H04N 23/54*     (2023.01)
    *H04N 23/55*     (2023.01)
    *H04N 23/90*     (2023.01)

(52) U.S. Cl.
    CPC .............. *G06V 10/25* (2022.01); *G06V 10/56* (2022.01); *H04N 23/54* (2023.01)

(58) Field of Classification Search
    USPC .................................................... 348/207.99
    See application file for complete search history.

(56) References Cited

U.S. PATENT DOCUMENTS

| | | |
|---|---|---|
| 9,689,551 B2 | 6/2017 | Fidler et al. |
| 9,998,692 B1* | 6/2018 | Griffiths ............... H04N 25/585 |
| 10,345,582 B2 | 7/2019 | Schneider et al. |
| 11,006,030 B2 | 5/2021 | Lee et al. |
| 11,070,744 B2 | 7/2021 | Du |
| 11,525,988 B2 | 12/2022 | Wicker et al. |
| 2004/0008250 A1* | 1/2004 | Thal ..................... H04N 13/239 348/E13.016 |
| 2006/0125921 A1 | 6/2006 | Foote |
| 2013/0329021 A1 | 12/2013 | Fidler et al. |
| 2015/0173846 A1 | 6/2015 | Schneider et al. |
| 2019/0327421 A1* | 10/2019 | Emmerich ........... H04N 23/673 |
| 2020/0404188 A1 | 12/2020 | Glaser et al. |

FOREIGN PATENT DOCUMENTS

| | | |
|---|---|---|
| CN | 110235044 A | 9/2019 |
| CN | 109480762 B | 9/2021 |
| EP | 2678856 B1 | 8/2017 |
| JP | 4717863 B2 | 7/2011 |
| KR | 10-2017-0051965 A | 5/2017 |
| WO | 95/33343 A1 | 12/1995 |
| WO | 03/021296 A2 | 3/2003 |
| WO | 2016/187675 A1 | 12/2016 |
| WO | 2020/246861 A1 | 12/2020 |
| WO | 2021/122471 A1 | 6/2021 |

OTHER PUBLICATIONS

Chengchao Qu et al., "Capturing Ground Truth Super-Resolution Data," Vision and Fusion Laboratory, Karlsruhe Institute of Technology, Fraunhofer IOSB [Total 5 pages].

Andrey Ignatov et al., "DSLR-Quality Photos on Mobile Devices with Deep Convolutional Networks," arXiv:1704.02470v2 [cs.CV] Sep. 5, 2017 [Total 16 pages].

Brian S. Eastwood et al., "Image Alignment for Multiple Camera High Dynamic Range Microscopy," Colby College, pp. 225-232.

* cited by examiner

DEVICE AND METHOD FOR GATHERING IMAGE SETS

CROSS-REFERENCE TO RELATED APPLICATION(S)

This application is based on and claims priority under 35 U.S.C. § 119(a) of Russia Patent Application No. 2022127272, filed on Oct. 20, 2022, in the Russian Federal Service for Intellectual Property, the disclosure of which is incorporated by reference herein in its entirety.

BACKGROUND

1. Field

The disclosure relates to devices and methods for gathering image sets, and more particularly, to gathering image sets consisting of one or more low quality images and respective one or more high quality images obtained from two or more different cameras, for use in the tasks of image quality enhancement by neural networks.

2. Description of Related Art

Image sets consisting of one or more low quality images and respective one or more high quality images obtained from two or more different digital cameras or video cameras (hereinafter referred to as "cameras") may be used in the tasks of image quality enhancement by neural networks. The neural networks are trained to "match" an original image (low quality, "input") to a ground truth image (high quality, "right answer"). The neural network trained on such image sets may be used at output of an image capture device to produce high quality images even where only low quality images have been captured.

The main requirement to such devices and methods for gathering image sets is to gather images that match so well (e.g., have minimal or required geometric and photometric differences) that they can be used without post-processing, or with minimal post-processing for training neural network models to address a number of image enhancement tasks, such as denoising, super resolution, detail enhancement, deblurring, demosaicing and create an image signal processing (ISP) pipeline.

The first challenge in fulfilling these requirements is the difference in optical characteristics of cameras. Even with provision of optical coupling (alignment of optical axes in space) of cameras via a beam splitter, the difference in optical characteristics will cause difference in the depth of field of the imaged space and optical aberrations. Therefore, alignment of images in a set without post-processing is possible only to a certain extent.

The second challenge is time correlation of images. To match mutual positions of objects in images, capture of the images should be synchronized (simultaneous or with a specified delay between cameras). Otherwise, mutual positions of the objects may differ, for example, due to their movement.

One more challenge is the support of different combinations of cameras with different optics and camera sensors, such as industrial cameras, smartphone cameras, digital single-lens reflex (digital SLR) cameras, and digital interchangeable lens (DIL) cameras.

The above challenges can be circumvented using the following approaches.

1. Gathering Image Sets by Artificial Image Quality Degradation

Artificial degradation in image quality is often used to gather image sets: low quality images are produced from high quality images by applying a degradation model. Neural networks trained on such synthetic data tend to remember the degradation model; their applicability to real data is very weak, especially in the tasks where pixel-by-pixel image quality enhancement is required (down to the finest super-resolution details). For implementing, this approach requires a precise and realistic image degradation model, while the actual degradation processes are generally unknown. To gather image sets, high quality source images are needed in practice: they must not contain features caused by the optics with which they were taken. Also, high quality images can be gathered by rendering, but this is quite a difficult task.

2. Gathering Image Sets Using a Single Camera by Quick Successive Capture with Different Quality Settings Image sets obtained from one camera by quick successive capture with different settings are only applicable for a limited number of tasks, such as detail enhancement or denoising, and only for almost static scenes. Training on such sets requires a complex neural network architecture that could compensate for poor match between images, inevitably occurring if the captured scene changes during capture.

3. Gathering Image Sets Using Multiple Cameras 3.1 Gathering Image Sets Using Multiple Adjacent Cameras The main disadvantage of this approach is that the cameras see the same scene at different angles from different points in space (optical axes of the cameras cross in space). This causes unmatched mutual positions of the objects located at different distances from the cameras in the images, which is especially essential for scenes extended in depth. Fields of view of adjacent cameras overlap only partially. In this case, it is impossible to compensate for the difference between images by global transformations, while local transformations can lead to degradation of details. Models trained on such image sets for which pixel-by-pixel alignment is not possible are not suitable for enhancing fine image details and are applicable to only a limited number of scenarios.

3.2 Gathering Image Sets Using Two Optically Coupled Cameras

The use of two cameras, whose optical axes are coupled in space via a beam splitter, potentially makes it possible to achieve better alignment between images than options 2 and 3.1. Prior art works using this approach do not pay due attention to good initial alignment of images by adjustment of the position of cameras in space and their synchronization, and use complex post-processing for final alignment. However, as is commonly known, the less data is contained in post-processing, the more suitable it is for training models, since complex post-processing can introduce geometric distortions into processed image and disrupt the natural noise profile. If the cameras are poorly synchronized, an attempt to align images by post-processing leads to artifacts on moving objects. As pixel-by-pixel image alignment is impossible due to poor initial adjustment of cameras, models trained on such image sets are unsuitable for enhancing fine image details and are applicable to only a limited number of scenarios. In addition, this approach requires a static scene (when there is no synchronization) and complex neural network architecture.

Therefore, a common problem of conventional approaches is the lack of diversity of gathered data. Generally, all the data is acquired for a single task—super resolution of the image. Existing image sets with well-aligned images are small and obtained for quasi-static scenes in laboratory conditions for one set of cameras. It is difficult to obtain similar data outside the laboratory conditions and for various combinations of cameras, because mechanical vibrations and movement of lenses during refocusing can induce misalignment of optical axes of the cameras. Ordinary cameras (e.g., single-lens reflex (SLR) cameras, smartphone cameras), having no reliable fixation ability, are especially susceptible to vibrations in contrast to industrial cameras, which have multiple mounting holes.

These challenges could be circumvented by a versatile device providing synchronization and adjustment of cameras, and maintaining the adjustment during operation. A self-adjusting system would greatly simplify the replacement of a camera of one type with a camera of another type, provide readjustment of the system in case of mismatches during operation, and enable acquisition of a variety of image sets with different scenes and under different conditions.

The document "ImagePairs: Realistic Super Resolution Dataset via Beam Splitter Camera Rig", Microsoft/arXiv: 2004.08513v1, publication date 18 Apr. 2020, proposes two cameras with different camera sensors and different optics (low and high resolution camera), installed in adjustment mounts with six degrees of freedom, whose the optical axes are coupled via a beam splitter. Images from the cameras are aligned by multiple-step adjustment using a number of adjustment targets. Distortion is corrected in both captured images for more precise alignment, a homography transformation is applied to one of them, and a local alignment technique based on "patches" or parts of the image is applied. Image pairs are used to train models for super resolution and image enhancement tasks, and to create an image signal processing (ISP) pipeline. The disadvantages of this approach include the use of complex post-processing (performed also with different processing parameters for each local neighborhood) for final alignment of images, and the lack of synchronization between cameras, which leads to a mismatch in the position of moving objects between images, this, in turn, gives rise to geometric artifacts caused by complex post-processing.

Another document "Capturing ground truth super resolution data", Karlsruhe Institute of Technology/Fraunhofer IOSB/DOI: 10.1109/ICIP.2016.7532872, publication date 09.2016, describes a setup comprising two cameras with identical light sensors and different optics (wide-angle lens and zoom lens), one of which is installed on a tip-and-tilt kinetic platform and whose optical axes are coupled via a beam splitter. Images from the cameras are aligned using adjustment performed by compensation for rotation in the light sensor plane using the tip-and-tilt kinetic platform and scaling using the zoom lens. Remaining shifts are compensated for by the Lucas-Kanade algorithm during post-processing. Image pairs obtained by the setup are used to train models for super resolution tasks. The disadvantages of this approach include the misalignment of optical axes of the cameras in space, therefore, the disclosure is applicable only to quasi-flat scenes, and the rough initial alignment of images by camera adjustment, which requires complex post-processing based on estimation of the light flux for final alignment of images.

The document "DSLR-Quality Photos on Mobile Devices with Deep Convolutional Networks", ETH Zurich/arXiv: 1704.02470v2, publication date 5 Sep. 2017, describes a method for gathering image pairs using two cameras with different camera sensors and different optics (reflex cameras and smartphones), which are placed adjacent to each other and have partially overlapping fields of view. Captured images are aligned using homography transformation calculated based on matching scene keypoints found by SIFT (Scale Invariant Feature Transformation) algorithm. Image pairs are used to train models for image quality enhancement tasks. The disadvantage of this approach is that the images cannot be depth-aligned, since the cameras have different viewing angles and spatial positions.

The document WO 2020/246861 A1, publication date 12 Oct. 2020, discloses "Method and Apparatus for Training Neural Network Model for Enhancing Image Detail", comprising producing image pairs with one camera by quick sequential capture of a pair of images with different quality settings. Image pairs are used to train models for enhancing image detail and noise cancellation. The disadvantage of this approach is that it is applicable only for almost static scenes and a moderate difference in the exposures of images taken, and also that training on such image pairs requires complex neural network architecture to compensate for poor alignment of sequentially captured frames.

SUMMARY

In accordance with an aspect of the disclosure, a device for gathering image sets, includes N digital cameras, where the N digital cameras including one or more ground truth cameras for capturing high quality ground truth images and one or more target cameras for capturing low quality target images, the N digital cameras being optically coupled via N−1 beam splitters, at least N−1 cameras of the N digital cameras being mounted on automatically adjustable mounts. The device includes at least one processor coupled to the N digital cameras and the automatically adjustable mounts, the at least one process configured to control communication between components of the device. The device includes at least one computer readable storage device storing instructions executable by the at least one processor. The instructions cause the at least one processor to: adjust the at least N−1 cameras by actuating the automatically adjustable mounts on which the at least N−1 cameras are mounted; synchronize image capture by the digital cameras; and control the digital cameras to gather sets of N images. The at least N−1 cameras are adjusted based on at least one set of N images of a scene.

The instructions may further cause the at least one processor to perform color calibration of the N−1 cameras to match colors of the ground truth images to colors of the target images.

The instructions may further cause the at least one processor to calculate coefficients of polynomial transformations to match spatial coordinates of the ground truth images to spatial coordinates of the target images, and to apply the polynomial transformations to the ground truth images, to thereby spatially align the ground truth images with the target images.

Cameras, of the N digital cameras, with substantially identical lenses and substantially identical camera sensors may form optical images with substantially identical parameters of the same scene which are spatially aligned in a central region of each image.

Cameras, of the N digital cameras, with substantially identical lenses and different camera sensors may form optical images with different parameters of the same scene, scaled to have a same size, which are spatially aligned in a central region of each image.

Cameras, of the N digital cameras, with different lenses and substantially identical camera sensors may form optical images with different parameters of the same scene, scaled to have a same size, which are spatially aligned in a central region of each image.

Cameras, of the N digital cameras, with different lenses and different camera sensors may form optical images with different parameters of the same scene, scaled to have a same size, which are spatially aligned in a central region of each image.

The device may further include at least one optical filter inserted in front of at least one camera of the N digital cameras and configured to independently modify light flux in at least one optical channel of the device by at least one of by attenuating, spectral filtering, or polarization filtering.

In accordance with an aspect of the disclosure, another device is provided for gathering image sets. The device includes N digital cameras, where the N digital cameras including one or more ground truth cameras for capturing high quality ground truth images and one or more target cameras for capturing low quality target images, the N digital cameras being optically coupled via N−1 beam splitters, at least N−1 cameras of the N digital cameras being mounted on automatically adjustable mounts. The device includes at least two focusable adjustment target simulators optically coupled via a beam splitter, each focusable adjustment target simulator including a light source, a test object, and a collimator. The device includes at least one processor coupled to the N digital cameras, the automatically adjustable mounts, and the adjustment target simulators, the at least one processor configured to control communication between components of the device. The device includes at least one computer readable storage device storing instructions executable by the at least one processor. The instructions cause the at least one processor to: form virtual images of an adjustment target at two predetermined distances by the at least two focusable adjustment target simulators; adjust the at least N−1 cameras of the N digital cameras by actuating the automatically adjustable mounts on which the at least N−1 cameras are installed; synchronize image capture by the digital cameras; control the digital cameras to capture sets of images; and issue synchronization commands for synchronizing the digital cameras when capturing an image set. The at least N−1 cameras are adjusted based on images of a virtual adjustment target, to thereby set capture parameters for the digital cameras.

The instructions may further cause the at least one processor to perform color calibration of the N−1 cameras to match colors of the ground truth images to colors of the target images.

The instructions may further cause the at least one processor to calculate coefficients of polynomial transformations to match spatial coordinates of the ground truth images to spatial coordinates of the target images, and to apply the polynomial transformations to the ground truth images, to thereby spatially align the ground truth images with the target images.

Cameras, of the N digital cameras, with substantially identical lenses and substantially identical camera sensors may form optical images with substantially identical parameters of the same scene which are spatially aligned in a central region of each image.

Cameras, of the N digital cameras, with substantially identical lenses and different camera sensors may form optical images with different parameters of the same scene, scaled to have a same size, which are spatially aligned in a central region of each image.

Cameras, of the N digital cameras, with different lenses and substantially identical camera sensors may form optical images with different parameters of the same scene, scaled to have a same size, which are spatially aligned in a central region of each image.

Cameras, of the N digital cameras, with different lenses and different camera sensors may form optical images with different parameters of the same scene, scaled to have a same size, which are spatially aligned in a central region of each image.

The device may further include at least one optical filter inserted in front of at least one camera of the N digital cameras and configured to independently modify light flux in at least one optical channel of the device.

In accordance with an aspect of the disclosure, a method for gathering image sets, includes focusing N digital cameras, where the N digital cameras forming a system of digital cameras optically coupled via N−1 beam splitters, the N digital cameras including one or more ground truth cameras for capturing high quality ground truth images, and one or more target cameras for capturing low quality target images. The method includes adjusting the system of digital cameras using a selected algorithm to align images in a central region. The method includes using the N digital cameras, forming optical images with a same scene aligned in the central region of each image. The method includes obtaining a captured set of N images from the system of digital cameras synchronized by capture start time with different capture parameters.

Synchronization parameters may be set such that at least one camera from the N cameras has a long exposure time, and remaining cameras from the N cameras other than the at least one camera have a short exposure time, a beginning of the short exposure time being shifted relative to a beginning of the long exposure time.

The method may further include preliminarily registering a calibration set of images of a calibration color target; based on the images in the calibration set, calculating a color correction matrix to enable matching colors of each image in the calibration set to colors of one image in the set; and based on the calculated color correction matrix, performing color correction of each image in the calibration set other than the one image.

The method may further include calculating coefficients of polynomial transformations to match spatial coordinates of the ground truth images in the captured set to spatial coordinates of the target images; and applying the polynomial transformations to the ground truth images in the captured set, to thereby spatially align the ground truth images to the target images.

One or more embodiments provide a system and method which support different types of cameras when gathering image sets and adjusts them, and maintains the adjustment in operation.

One or more embodiments also provide a system and method gather image sets for different scenarios, such as super resolution, enhancement of image detail, demosaicing.

One or more embodiments are also applicable to moving scenes and deblur scenarios.

Furthermore, one or more embodiments provide a system and method which dispense with post-processing for final alignment of images, or apply only global transformations to ground truth images in the set (thereby avoiding local geometric artifacts), while the images fed to the neural network input retain their original form.

Furthermore, one or more embodiments provide a system and method which enable adjustment of the system regardless of the scene, ensuring application to address a wide range of challenges.

BRIEF DESCRIPTION OF THE DRAWINGS

The above and other features and advantages of certain embodiments of the disclosure are explained in the following description taken in conjunction with the accompanying drawings, in which.

DETAILED DESCRIPTION

In accordance with certain embodiments of the present disclosure, a self-adjusting device is provided for gathering image sets using N digital cameras, where N≥2, optically coupled via N−1 beam splitters, which would allow mounting thereon any N cameras with any mounts, particularly, one or more ground truth cameras for capturing high quality images, and one or more target cameras for capturing low quality images. Cameras are mounted on adjustable mounts providing linear and rotary displacements. An adjustment unit provides high-precision control of the mounts to adjust the system using keypoints found in the captured scene on an adjustment target or using an adjustment target simulation unit, to initially align the images as precisely as possible using shifts, tilts and rotations of the cameras and thereby minimize post-processing for final alignment of the images. Cameras are controlled by a control unit.

In accordance with certain embodiments of the present disclosure, a method is provided for gathering image sets using the above device, which can be used to train image enhancement models based on neural networks.

Figure 1:
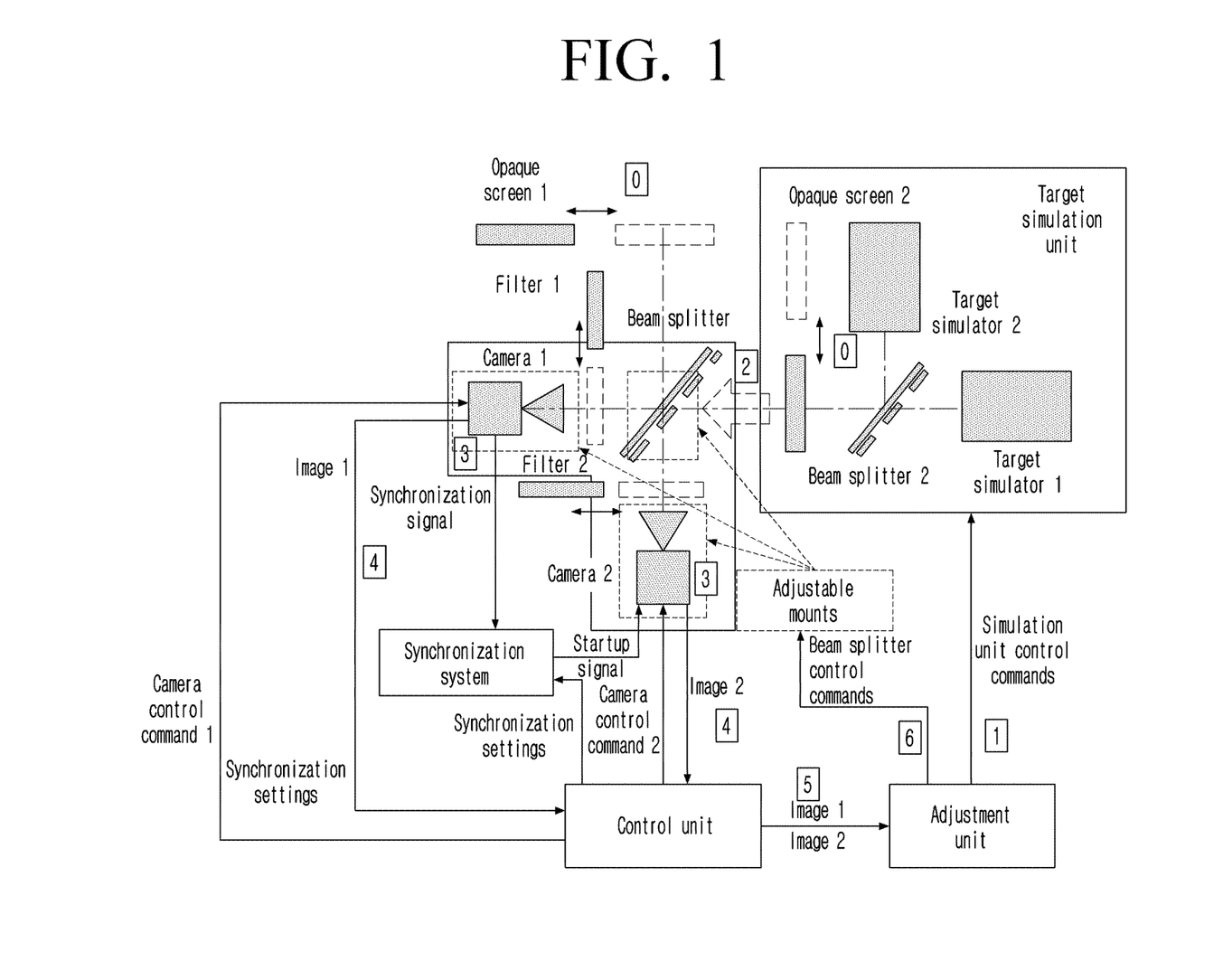
FIG. 1 is a schematic view of a device for gathering image sets in a two-camera configuration, according to an embodiment of the disclosure.

FIG. 1 shows schematically a device for gathering image sets, comprising two digital cameras optically coupled via a beam splitter, according to an embodiment of the disclosure. Depending on the task to be solved, various combinations of cameras are possible, in particular: cameras with identical (or substantially identical) lenses and identical (or substantially identical) matrix camera sensors, cameras with identical (or substantially identical) lenses and different camera sensors, cameras with different lenses and identical (or substantially identical) camera sensors, cameras with different lenses and different camera sensors. Moreover, at least one camera is mounted on adjustable mounts controlled by an adjustment unit and providing linear and rotary displacements, driven by the adjustment unit. Options are also possible where both cameras, or one camera and a beam splitter, or both cameras and a beam splitter are mounted on adjustable mounts. The adjustment unit automatically aligns images from two cameras by adjusting according to an algorithm based on comparing the position of keypoints on two images. These keypoints can be taken from a scene (less precise), or from a two-plane adjustment target (more precise, using a physical target), or from a virtual target formed by a target simulation unit. The cameras are synchronized for capture by a synchronization system (for example, using an electrical and/or optical trigger, network time protocol), which matches capture start between cameras in the master camera-slave camera mode in accordance with settings received from the control unit directly or via the master camera, depending on the synchronization system. If a synchronization system is used, the control unit sends capture signal to one of the cameras (referred to as master camera). This camera issues capture command to a second camera (referred to as slave camera, can be one or more) either by a trigger or via a network protocol. In FIG. 1, camera 1 is the master camera, which issues capture command to a slave camera 2 by sending synchronization signal to the synchronization system, which then issues trigger signal to the camera 2.

Herein, the control unit, the adjustment unit, and the synchronization system may individually or collectively include at least one processor, and at least one computer readable storage device storing instructions which are executed by the at least one processor to perform and control operations of the camera and other components. Those of skill in the art, on review of the functions of these components as described here, will be appreciate the instructions and algorithms for implementing these functions as computer readable instructions.

Capture is also possible without a synchronization system. For example, in certain embodiments, both cameras receive capture command directly from the control unit. But in this case, images will not be time aligned, which is especially noticeable on moving objects. This option is most preferable for static scenes. In contrast, the synchronization system takes into account the difference in processing time of the control signal/processing of the cameras and correctly places capture delays on each camera so that the cameras eventually capture at substantially the same global time instant or with a required delay relative to each other.

Optical filters may be inserted into optical channels of the device to independently modify the light flux coming to the cameras. The control unit controls the cameras, controls the synchronization system, provides communication between individual parts of the device, transfers captured images from both cameras to the adjustment unit, which controls the adjustable camera mounts.

In operation, the device performs a method for gathering image sets with various combinations of lenses and/or camera sensors and/or filters with tuned synchronization and, if desirable, very simple post-processing of only ground truth images in the image set, which may include application of color correction and polynomial transformations. The method for gathering image sets comprises the following operations.

First, cameras that require focusing are focused to the applicable distance. The device is adjusted using a selected algorithm to achieve good image alignment in the central region where optical aberrations are small. The adjustment may be repeated during the capture process for further alignment.

Using optically coupled cameras of the same model and settings, at least two optical images with identical (or substantially identical) parameters (e.g., magnification, resolution, etc.) of the same scene are formed with good spatial alignment.

Image sets are registered with synchronization of capture start time with different capture parameters (exposure, AD converter gain). The synchronization parameters are set based on the task: at least two cameras capture synchronously, or at least one of the cameras has a long exposure time, and the other camera has a short exposure time, the beginning of which is shifted relative to the beginning of the long one by a required amount. The resulting image sets are used for image quality enhancement, deblurring, and denoising.

A further embodiment of the method further comprises color calibration, including registering a set of images of a calibration color target, and based on these images calculating a color correction matrix to match colors of all images in the sets to colors of one image in the set.

An additional embodiment of the method comprises calculating, for the image set, coefficients of polynomial transformations to match spatial coordinates of images of ground truth cameras in the set to those of images of target cameras in the set, and applying polynomial transformations to images from the ground truth cameras in the set for more precise alignment of images.

An additional embodiment of the method comprises, using optically coupled cameras with identical (or substantially identical) lenses and different camera sensors, forming optical images with different parameters and different resolutions of the same scene with good spatial alignment, where all the images are scaled to fit one image in the central region of the image. The resulting image sets are used e.g. for image super resolution task.

An additional embodiment of the method comprises, using optically coupled cameras with different lenses and identical (or substantially identical) camera sensors, forming optical images of the same scene with different magnification, different parameters, with good spatial alignment, where all the images are scaled to fit one image in the central region of the image. The resulting image sets are used e.g. for image super resolution task.

An additional embodiment of the method comprises, using optically coupled cameras with different lenses and different camera sensors, forming optical images of the same scene with different magnification and resolution of the same scene with good spatial alignment, where all the images are scaled to fit one image in the central region of the image. The resulting image sets are used e.g. for image super resolution task.

An additional embodiment of the method comprises modifying the light flux for at least one of the cameras using a filter/filters installed in optical channels of the device in front of the camera/cameras, thereby attenuating or spectral filtering or polarization filtering.

Therefore, as shown in FIG. 1, a feature of the disclosure is the provision of an adjustment unit for automatic adjustment of the device based on the observed scene.

Figure 2:
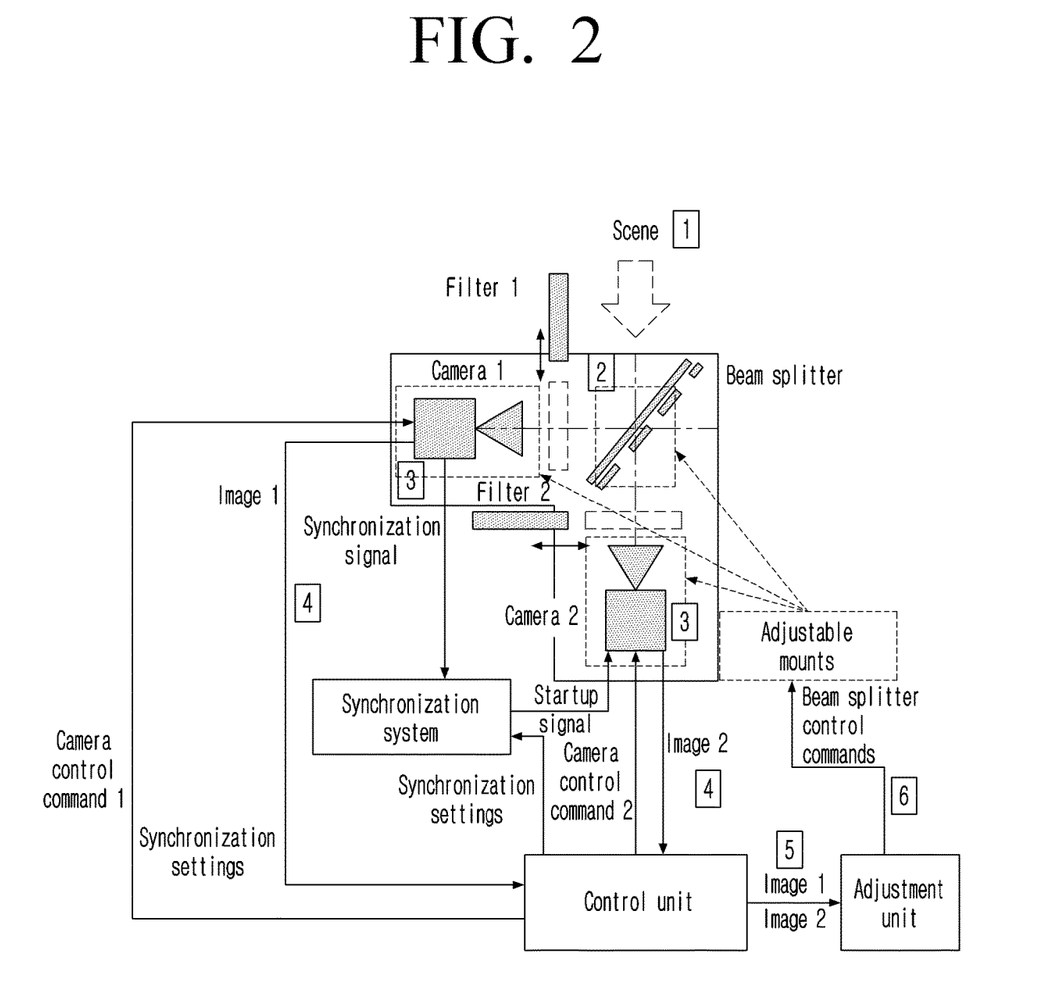
FIG. 2 is a functional diagram of a device in a two-camera configuration that provides automatic adjustment to the observed scene, according to an embodiment of the disclosure.

FIG. 2 shows a functional diagram of a device in a two-camera configuration, which provides automatic adjustment based on the observed scene using an adjustment unit, according to an embodiment of the disclosure. The diagram in FIG. 2 differs from that in FIG. 1 by the absence of a target simulation unit. In FIG. 2, the numbers stand for the following:

1—Scene with objects, or with a two-plane adjustment target.

2—Light beam that carries the image enters the beam splitter, which splits it into two beams.

3—Beams are sent to first camera and second camera, respectively, where they form images of the scene on matrix sensors of each camera.

4—On command from the control unit, two images are registered and transferred from each camera to control unit.

5—Control unit sends registered images to adjustment unit if the user intends to adjust the device; the adjustment unit detects keypoints of the observed scene, which are present in both registered images.

Control unit provides the user with the opportunity to select adjustment mode:

(1) mode of adjustment based on keypoints (elements) found on the scene uses keypoints belonging to objects located in the field of view of the device, automatically searching for common keypoints present in both images; the advantage of this mode is that it does not require special adjustment targets to be placed in front of the device, and keypoints are taken from objects in the field of view of the cameras; however, for some scenes it can be difficult to find well-detected keypoints, which narrows the application of this mode; it is also possible that the keypoints are unevenly distributed in the scene space, therefore, the precision of calculating the displacement and rotation of cameras based on such sparse uneven keypoints will be lower;

(2) mode of adjustment using an adjustment target containing a previously known pattern, on which characteristic elements are easily detected, and consisting of two planes at different distances, placed in front of the device; this mode requires placing an adjustment target with a previously known pattern in front of the device, on which the search for keypoints/elements will be performed; the advantage of this mode is that the adjustment target can be very easily detected in the field of view of the device and it provides uniform filling of the field of view with keypoints that can be detected with high precision, since the pattern (e.g., the pattern on the target) is known in advance and selected specifically for this task, therefore, the precision of estimating displacements using such a target will be higher; the disadvantage of this mode is that it requires a physical adjustment target to be specially placed in the scene space;

(3) mode of adjustment based on a virtual target uses an adjustment target simulation unit (the mode can be used only in the configuration in FIG. 1) to build a virtual target image at an arbitrary place in the scene; the advantage of this mode is that the shape of a virtual adjustment target is chosen such that it can be very easily detected, and using this approach, the system can be adjusted regardless of the observed scene (even if there are no objects in the field of view at all), which increases the operation reliability of the method.

The adjustment unit calculates, according to the mode selected by the user, the difference in coordinates of keypoints between the two images; if this difference exceeds a specified threshold, the adjustment unit calculates displacements and rotations of the cameras to minimize it.

The mechanism of comparing keypoint coordinates is described in detail below. In general, the comparison is carried out by calculating the difference in coordinates of these points and the ratio of distances between these points in two images. Direction of movement of the cameras is chosen to minimize the difference in coordinates.

6—Adjustment unit transfers control commands to movable mounts of a camera (or cameras and beam splitter) to align optical axes, rotation angles of camera sensors and entrance pupils of the cameras.

Having completed the adjustment, the user starts the procedure for gathering a set of images with settings required for the task to be solved; further, the resulting image set is used to train neural network-based models to enhance quality of images.

The above sequence of operations ensures automatic adjustment for various combinations of cameras and maintains the adjustment (e.g., performs readjustment) during operation.

Returning to FIG. 1, another feature of the disclosure is the provision of an adjustment target simulator unit, which enables adjustment of the system regardless of the scene.

As stated above, FIG. 1 shows a functional diagram of present device in a two-camera configuration, with detailed picture of the adjustment target simulator unit including two optically coupled target simulators, which build two virtual images of the target at different distances in front of the device, where the numbers stand for the following:

0—If the user selects the mode of adjustment based on virtual target, input window of the device is closed with a first opaque screen, and path to the target simulation unit is opened by removing a second opaque screen from the beam path.

1—Adjustment unit sends commands to the target simulator unit to turn on target simulator light sources and focus to create virtual targets at required distances.

2—Light beam, which carries images of two virtual targets from the target simulation unit, enters the beam splitter, where it is split into two beams.

3—Beams from the beam splitter are sent to camera 1 and camera 2, respectively.

4—On command from the control unit, two images are registered and transferred from each camera to the control unit.

5—Control unit sends the images to the adjustment unit if the user intends to adjust the system. The adjustment unit calculates required camera displacement direction based on keypoints detected according to the adjustment mode selected by the user.

6—Adjustment unit transfers control commands to movable adjustable mounts of a camera (or cameras and beam splitter) to align optical axes, rotation angles of the camera sensors and entrance pupils of the cameras.

Upon completing the adjustment, light sources of the target simulation unit are turned off; a screen blocking the target simulation unit is introduced into the beam path; the screen blocking the scene is removed from the beam path. The user starts gathering image sets with settings determined for the task to be solved; further, the resulting image set is used for deep learning of models to enhance images.

The above operations with the target simulation unit enable adjustment of the device regardless of the scene.

Figure 3:
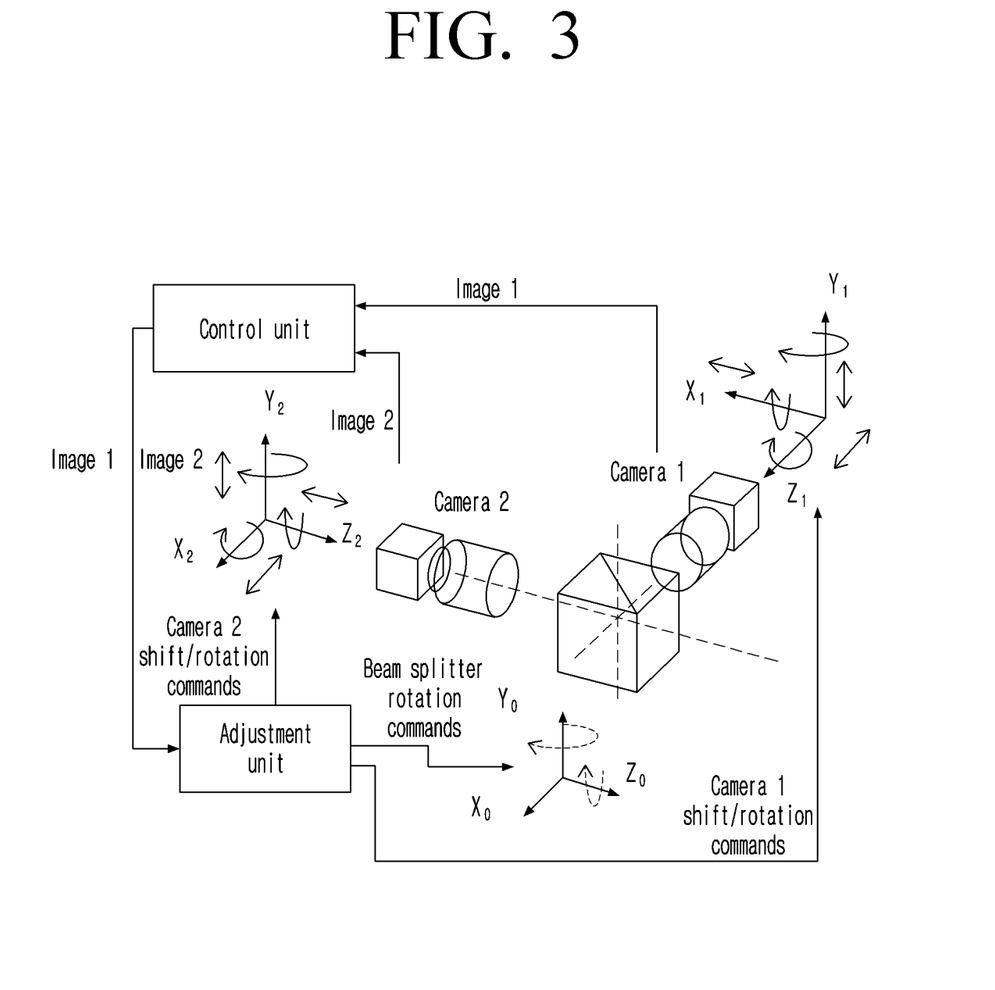
FIG. 3 illustrates operation of an adjustment unit, according to an embodiment of the disclosure.

FIG. 3 shows operation of the adjustment unit in the two-camera device, according to an embodiment of the disclosure.

Automated adjustable mounts should provide at least six degrees of freedom for image alignment using camera adjustment:

1) Camera 1 displacement along Y1 axis or camera 2 displacement along the Y2 axis;
2) Camera 1 displacement along X1 axis or camera 2 displacement along X2 axis;
3) Camera 1 displacement along Z1 axis or camera 2 displacement along Z2 axis;
4) Rotation of camera 1 around X1 axis or rotation of camera 2 around X2 axis (or rotation of the beam splitter around Z0 axis);
5) Rotation of camera 1 around Y1 axis or rotation of camera 2 around Y2 axis (or rotation of the beam splitter around Y0 axis);
6) Rotation of camera 1 around Z1 axis or rotation of camera 2 around Z2 axis.

It should be noted that rotations of the beam splitter can be provided by issuing commands to rotate the beam splitter, but are not desirable, since it is preferable to have a common fixed component for optical channels of the device.

The control unit initiates capturing the scene by the cameras and sends the captured images to the adjustment unit. The adjustment unit calculates the mismatch between the XYZ coordinate systems of the cameras and controls the adjustable mounts to align them by issuing shift/rotate commands to camera 1 and to camera 2.

Returning to the three adjustment modes described above, the following should be noted.

(1) The first option for selecting adjustment mode by the user is the adjustment mode based on keypoints found in the scene.

The scene-based adjustment performed by the adjustment unit uses keypoints found in the scene. This requires a scene extended in depth with keypoints evenly distributed within the field of view of the device.

The control unit focuses the cameras at the required distance. If the cameras do not have autofocus or electronic focus control, manual focusing is done by the user.

The adjustment unit provides the following adjustment operations:

1) Detecting corresponding keypoints present in both images;
2) Calculating the scaling factor as the ratio of distances between respective points on the first and second images. This factor can be taken into account when calculating displacements, or one of the images can be resized to adjust the scale.
3) Setting the same difference in vertical coordinates y of coinciding keypoints $\Delta y$ by vertical displacement of one of the cameras, followed by minimizing $\Delta y$ by rotating one of the cameras relative to the horizontal axis (or similarly rotating the beam splitter).
4) Setting the same difference in horizontal coordinates x of coinciding keypoints $\Delta x$ by horizontal displacement of one of the cameras, followed by minimizing $\Delta x$ by rotating one of the cameras around the vertical axis (or similarly rotating the beam splitter).
5) Rotating one of the cameras around the optical axis to match the angles of rotation of the camera sensors.
6) Setting the optimal axial position by moving one of the cameras along its optical axis so that to achieve a constant scaling factor within the depth of the scene.

In doing so, operations 2)-6) are not necessarily performed in the specified order and can be iterated.

The above operations ensure automatic alignment of images over the scene without using targets.

(2) The second option for selecting the adjustment mode by the user is the real target adjustment mode. Real target adjustment provides higher precision because adjustment targets are reliably evenly distributed within the field of view of the device and are known in advance.

Figure 4:
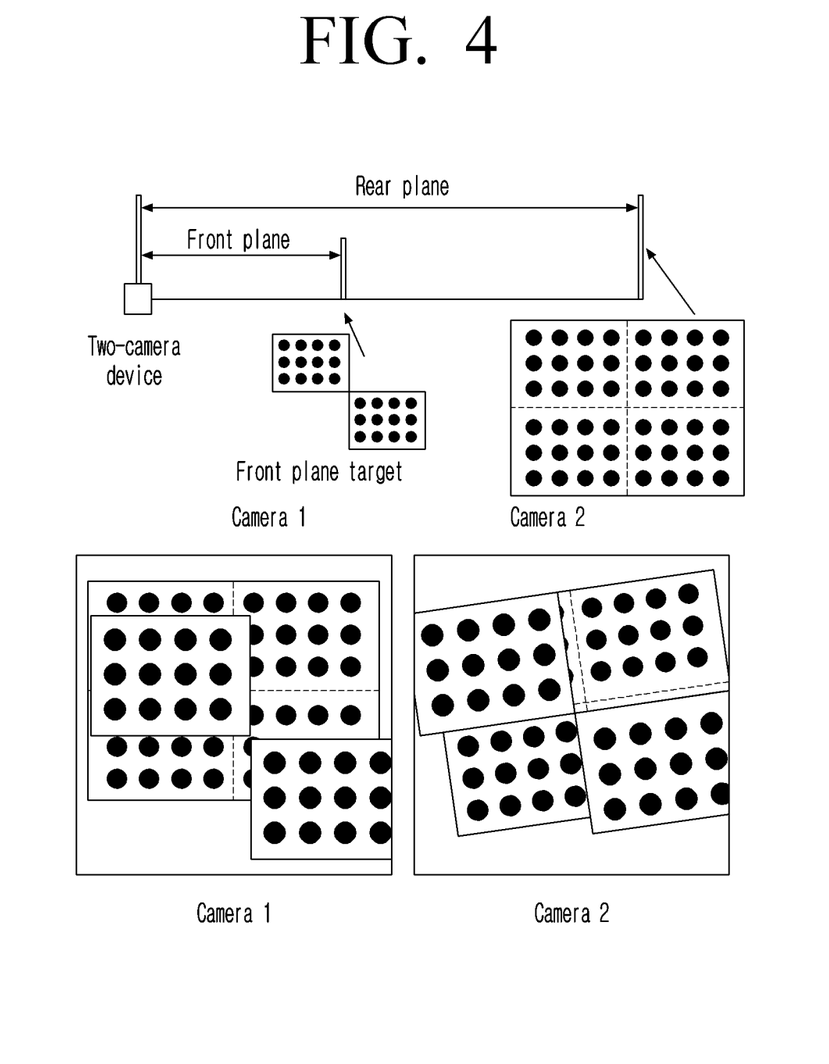
FIG. 4 is an example application of an adjustment unit to a two-plane adjustment target, according to an embodiment of the disclosure.

This requires a composite adjustment target including two targets mounted at different distances from the device, as shown at the upper part of FIG. 4.

A front plane target, which is closer to the device and contains an adjustment pattern (e.g., circles), allows a rear plane target, which is further away from the device, to be seen with the adjustment pattern. The adjustment pattern is chosen so that it can be easily detected and used to calculate coordinates of characteristic elements with high precision on its basis.

Adjustment targets are mounted so that the camera focusing plane is between them, or on one of them.

The control unit focuses the cameras at the required distance. If the cameras do not have autofocus or electronic focus control, manual focusing is done by the user.

Figure 5:
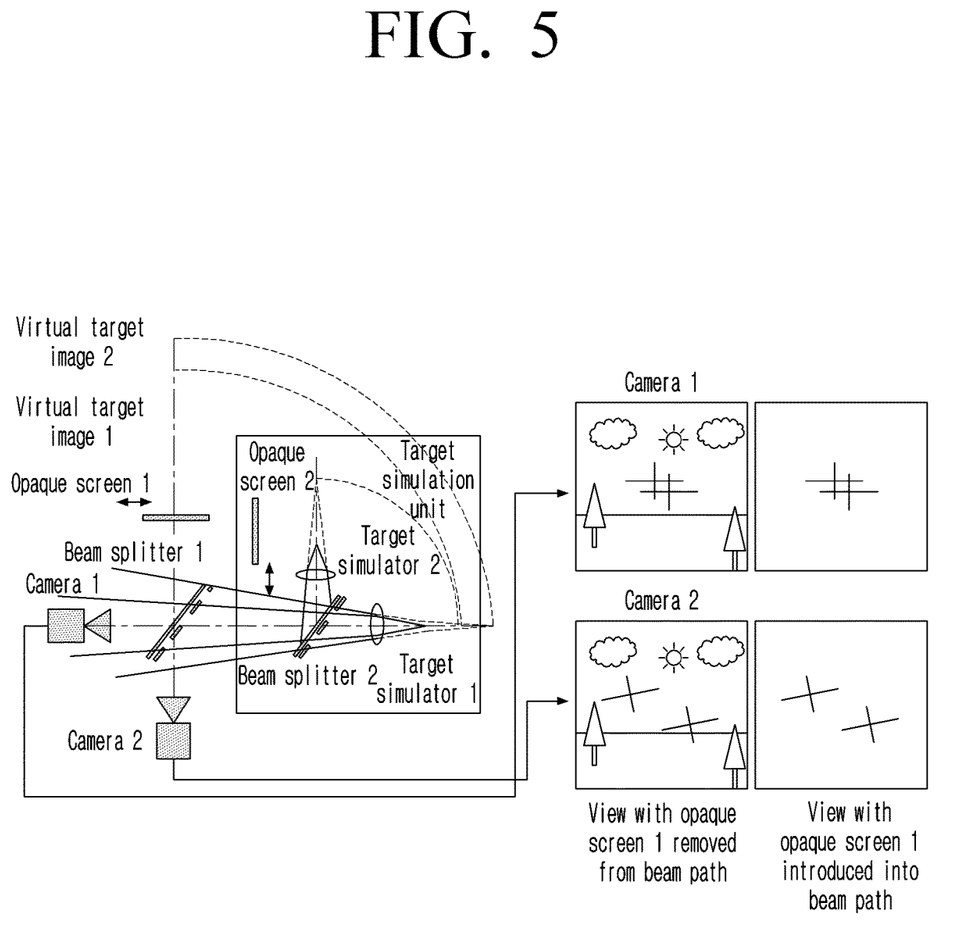
FIG. 5 is an optical diagram of a device in a two-camera configuration, implementing the virtual target adjustment mode, according to an embodiment of the disclosure.

In this mode, the adjustment unit provides the following adjustment operations:

1) Detecting characteristic elements of adjustment patterns on images from both cameras with high precision; moreover, each image contains adjustment patterns belonging to adjustment targets of the front and rear planes, for example, the front plane target occupies II and IV coordinate quarters, and the rear plane target occupies I and III coordinate quarters in the field of view of the cameras, as shown in FIG. 5; this is required to align optical axes of the cameras in space.

FIG. 4, lower part, shows a possible view of images from non-adjusted cameras, where the adjustment targets in the fields of view of the cameras are presented differently—they are shifted and/or tilted relative to each other.

2) Calculating the scaling factor as the ratio of distances between respective elements of the adjustment pattern on the first and second images for one of the targets (either front plane target or rear plane target). This factor can be taken into account when calculating displacements, or one of the images can be resized to adjust the image scale.

3) Setting the same difference in vertical coordinates Δy for respective elements of the adjustment pattern by vertical displacement of one of the cameras, followed by minimizing Δy by rotating one of the cameras relative to the horizontal axis (or rotating the beam splitter).

4) Setting the same difference in horizontal coordinates Δx for respective elements of the adjustment pattern by horizontal displacement of one of the cameras, followed by minimizing Δx by rotating one of the cameras relative to the vertical axis (or rotating the beam splitter).

5) Rotating one of the cameras around the optical axis to match the angles of rotation of the camera sensors.

6) Setting optimal axial position by moving one of the cameras along its optical axis so that to minimize the difference in scaling factors for front plane target and rear plane target.

In doing so, operations 2)-3) are not necessarily performed in the specified order and can be reiterated.

The above operations ensure greater reliability and higher precision compared to the first mode.

(3) The third option for selecting the adjustment mode by the user is the adjustment mode based on a virtual target.

FIG. 5 illustrates an optical schematic diagram of a device, which implements the virtual target adjustment mode, according to an embodiment of the disclosure. The device is generally similar to the device according to the first and second options for selecting the adjustment mode by the user, but further comprises an adjustment target simulation unit to simulate targets in the field of view of the camera system of the present device.

The target simulation unit comprises two focusable adjustment target simulators optically coupled via a beam splitter and each including a light source, a test object, and a collimator. Target simulators build virtual images of their test objects (targets), illuminated by light sources, at two specified distances in front of the two-camera system, thereby simulating a two-plane target (front plane target and rear plane target). The distances at which virtual images of targets are built are chosen similarly to the previous option—so that the focusing plane of the cameras lies between them, or on one of them.

Shape of virtual targets (test objects) is chosen so that they can be easily detected and used to calculate all the coordinate differences/ratios to be used for camera adjustment. In particular, FIG. 5, right side, shows a possible display of virtual targets, shown as crosses for illustrative purposes, when the system is not adjusted.

The adjustment unit controls the adjustable camera mounts using an algorithm that minimizes the difference in the position of the calibration targets on the images from the two cameras. Control operations are similar to those described above in relation to the second option for selecting the adjustment mode by the user.

During the adjustment, the opaque screen 2 is removed from the beam path, and the light sources of the simulators are turned on. After the adjustment, the light sources of the simulators are turned off, and the adjustment target simulation unit is covered with the movable opaque screen 2.

Moreover, there is a further embodiment of the third option for selecting the adjustment mode by the user, in which, for the period of adjustment, the opaque screen 2 is removed from the beam path, the scene is covered with the opaque screen 1, and the light sources of the simulators are turned on. After the adjustment, the light sources of the simulators are turned off, the adjustment target simulation unit is covered with the movable opaque screen 2, and the opaque screen 1 is removed from the beam path. Covering the scene during the adjustment with the screen 1 facilitates detection of virtual adjustment targets, which in this case will be observed against a dark background and not over the real scene, as shown in FIG. 6, right side, on the right and left, respectively.

The above operations ensure automatic camera adjustment regardless of the presence of keypoints in the scene and do not require physical targets.

Figure 6:
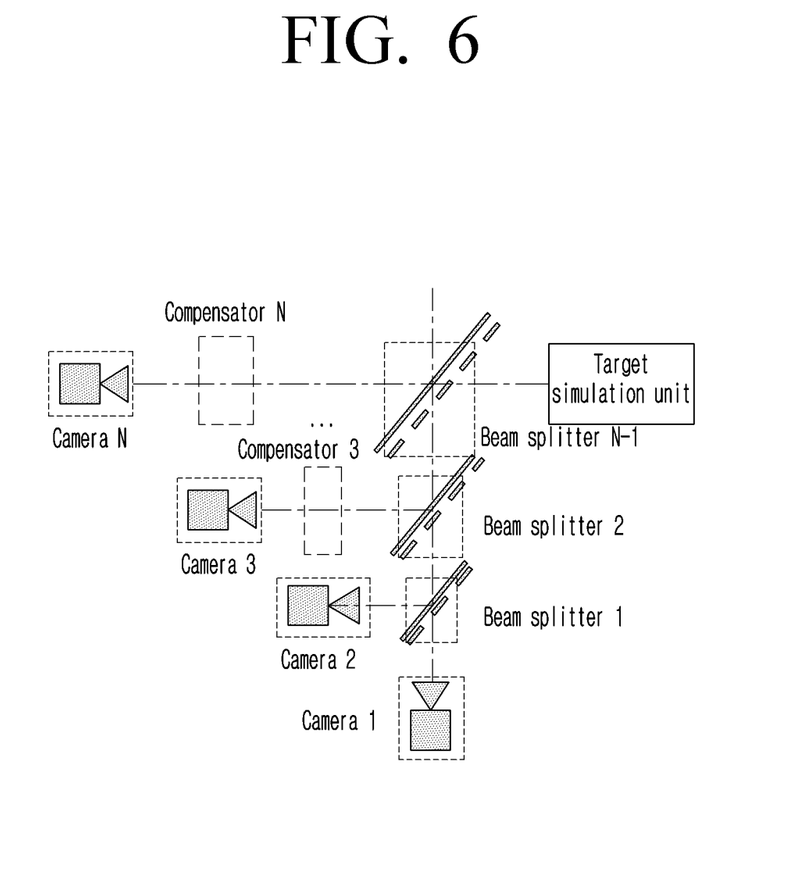
FIG. 6 is a schematic view of an N-camera device, according to an embodiment of the disclosure.

FIG. 6 schematically illustrates a device for gathering image sets, comprising N digital cameras, where N>2, according to an embodiment of the disclosure. It should be noted that according to the principle of operation, the schematic diagram shown in FIG. 6 is generally similar to that shown in FIG. 1, however, it is its modification involving not two digital cameras, but N digital cameras numbered in FIG. 6 as 1, 2, 3, . . . N, where N>2, optically coupled via N−1 beam splitter. In certain embodiments, to equalize the lengths of optical paths in the device channels (e.g., to compensate for the difference in the thickness of material of the beam splitters on the path from the device entrance to the camera), path difference compensators, such as plane-parallel plates, can be introduced into the device channels.

The number N of cameras that can be installed in the system may account for process considerations.

For example, with increasing the length of the optical path, aberrations accumulate in the material of the beam splitters. For beam splitters in the form of plane-parallel plates, the aberrations are small and will be invisible for a reasonable length of the system. Aberration compensators may be used to compensate for the aberrations.

The reduction in the system light transmission with each new beam splitter for the pairs of cameras following it may also be considered. This reduction can be used to simulate the operation of cameras in low light conditions. However, if this is not desirable, the light transmission can be equalized for all cameras using attenuating filters.

In addition, to maintain the field of view of the camera system when new cameras and beam splitters are added, each subsequent beam splitter may be increased in size over the previous one. In practice, beam splitters may have an upper limit to their size, resulting the field of view of the system decreasing as its length increases.

Additional Embodiments and Variants

Optical images with the same or different capture parameters with different magnification, resolution, etc. are formed depending on the specific task with different combinations of camera parameters in the set of cameras mounted on the device, particularly: cameras with identical (or substantially identical) lenses and identical (or substantially identical) matrix sensors, cameras with identical (or substantially identical) lenses and different sensors, cameras with different lenses and identical (or substantially identical) sensors, or cameras with different lenses and different sensors.

An optical filter or filters (neutral density, spectral, polarization) can optionally be inserted in front of at least one camera to independently modify the light flux in optical channels of the present device. This may be desirable, for example, to simulate the operation of one of the cameras in low light—in this case, an attenuating light filter is placed in front of the camera.

Before registering the image sets, a set of images of a calibration color target can be additionally registered. For example, a target containing samples of different colors can be captured. From these images, a color and/or brightness correction matrix is calculated, which enables matching colors and brightness of all images in the set to those of one image in the set, and thereby compensating for the difference in color rendering and brightness of different cameras in the set of cameras mounted on to the device.

Coefficients of polynomial transformations can also be additionally calculated. Calculated transformation coefficients can be applied to images from ground truth cameras in the set for more precise spatial alignment of image sets, and due to the fact that polynomial transformations are global and not local, they are applied to the entire image, rather than to its individual parts, which prevents the appearance of unwanted image artifacts described above in the description of challenges existing in the prior art.

Embodiments of the system and method of the disclosure can support different types of cameras and automatically adjust them to gather image sets, and, most importantly, maintain the adjustment state during operation when a set of images is registered.

Using embodiments of the system and method of the disclosure, post-processing of images is insignificant, and is not applied to all images in the set, in particular, it is applied only to images from ground truth cameras, or not at all, depending on the difference between characteristics of the cameras.

Embodiments of the system and method of the disclosure are applicable for various deep learning scenes and scenarios, in particular for moving objects and deblur scenario.

Embodiments of the system and method of the disclosure enable alignment of images by adjusting the cameras independently of the scene.

Embodiments of the system and method of the disclosure provide high (pixel-wise) precision of image alignment for certain scenarios (depending on the extent of difference between the cameras).

The image sets produced by embodiments of the system and method of the disclosure have a high precision of image alignment (up to one pixel in some scenarios); enable training models with simple, easily interpretable loss function due to the fact that a low-quality image is fed to input of the neural network, and the loss function during network training is a measure of difference between the image at output of the network and a higher quality ground truth image obtained from the ground truth camera; allow the use of simple architecture models which are not required to compensate for a large difference between images; can be used for a wide range of tasks (super resolution, denoising, deblurring, etc.); carry little post-processing or can be used without post-processing (in some scenarios).

Embodiments of the system and method of the disclosure support different cameras without a special mount, as the adjustment unit may perform re-adjustment during operation as desired.

Embodiments of the system and method of the disclosure are suitable for gathering image sets for various deep learning tasks, by independently modifying the light flux in the device channels and synchronize the cameras.

While the system and method of the disclosure have been described with reference to some illustrative embodiments, it will be appreciated that they is not limited to these specific embodiments. On the contrary, the disclosure is intended to include all alternatives, corrections, and equivalents that may be included within the spirit and scope of the claims.

Furthermore, the scope of the disclosure includes all equivalents even if the claims are amended during prosecution.

What is claimed is:

1. A device for gathering image sets, the device comprising:
    N digital cameras, where N2, the N digital cameras comprising one or more ground truth cameras for capturing high quality ground truth images and one or more target cameras for capturing low quality target images, the N digital cameras being optically coupled via N−1 beam splitters, at least N−1 cameras of the N digital cameras being mounted on automatically adjustable mounts;
    at least one processor coupled to the N digital cameras and the automatically adjustable mounts, the at least one processor configured to control communication between components of the device; and
    at least one computer readable storage device storing instructions executable by the at least one processor to cause the at least one processor to:
        adjust the at least N−1 cameras by actuating the automatically adjustable mounts on which the at least N−1 cameras are mounted;
        synchronize image capture by the digital cameras; and
        control the digital cameras to gather sets of N images, wherein the at least N−1 cameras are adjusted based on at least one set of N images of a scene.

2. The device of claim 1, wherein the instructions further cause the at least one processor to perform color calibration of the N−1 cameras to match colors of the ground truth images to colors of the target images.

3. The device of claim 2, wherein the instructions further cause the at least one processor to calculate coefficients of polynomial transformations to match spatial coordinates of the ground truth images to spatial coordinates of the target images, and to apply the polynomial transformations to the ground truth images, to thereby spatially align the ground truth images with the target images.

4. The device of claim 3, wherein cameras, of the N digital cameras, with substantially identical lenses and substantially identical camera sensors form optical images with substantially identical parameters of the same scene which are spatially aligned in a central region of each image.

5. The device of claim 3, wherein cameras, of the N digital cameras, with substantially identical lenses and different camera sensors form optical images with different parameters of the same scene, scaled to have a same size, which are spatially aligned in a central region of each image.

6. The device of claim 3, wherein cameras, of the N digital cameras, with different lenses and substantially identical camera sensors form optical images with different parameters of the same scene, scaled to have a same size, which are spatially aligned in a central region of each image.

7. The device of claim 3, wherein cameras, of the N digital cameras, with different lenses and different camera sensors form optical images with different parameters of the same scene, scaled to have a same size, which are spatially aligned in a central region of each image.

8. The device of claim 7, further comprising at least one optical filter inserted in front of at least one camera of the N digital cameras and configured to independently modify light flux in at least one optical channel of the device by at least one of attenuating, spectral filtering, or polarization filtering.

9. A device for gathering image sets, the device comprising:
N digital cameras, where N≥2, the N digital cameras comprising one or more ground truth cameras for capturing high quality ground truth images and one or more target cameras for capturing low quality target images, the N digital cameras being optically coupled via N−1 beam splitters, at least N−1 cameras of the N digital cameras being mounted on automatically adjustable mounts;
at least two focusable adjustment target simulators optically coupled via a beam splitter, each focusable adjustment target simulator comprising a light source, a test object, and a collimator;
at least one processor coupled to the N digital cameras, the automatically adjustable mounts, and the adjustment target simulators, the at least one processor configured to control communication between components of the device; and
at least one computer readable storage device storing instructions executable by the at least one processor to cause the at least one processor to:
form virtual images of an adjustment target at two predetermined distances by the at least two focusable adjustment target simulators;
adjust the at least N−1 cameras of the N digital cameras by actuating the automatically adjustable mounts on which the at least N−1 cameras are installed;
synchronize image capture by the digital cameras; and
control the digital cameras to capture sets of images; and
issue synchronization commands for synchronizing the digital cameras when capturing an image set,
wherein the at least N−1 cameras are adjusted based on images of a virtual adjustment target, to thereby set capture parameters for the digital cameras.

10. The device of claim 9, wherein the instructions further cause the at least one processor to perform color calibration of the N−1 cameras to match colors of the ground truth images to colors of the target images.

11. The device of claim 10, wherein the instructions further cause the at least one processor to calculate coefficients of polynomial transformations to match spatial coordinates of the ground truth images to spatial coordinates of the target images, and to apply the polynomial transformations to the ground truth images, to thereby spatially align the ground truth images with the target images.

12. The device of claim 11, wherein cameras, of the N digital cameras, with substantially identical lenses and substantially identical camera sensors form optical images with substantially identical parameters of the same scene which are spatially aligned in a central region of each image.

13. The device of claim 11, wherein cameras, of the N digital cameras, with substantially identical lenses and different camera sensors form optical images with different parameters of the same scene, scaled to have a same size, which are spatially aligned in a central region of each image.

14. The device of claim 11, wherein cameras, of the N digital cameras, with different lenses and substantially identical camera sensors form optical images with different parameters of the same scene, scaled to have a same size, which are spatially aligned in a central region of each image.

15. The device of claim 11, wherein cameras, of the N digital cameras, with different lenses and different camera sensors form optical images with different parameters of the same scene, scaled to have a same size, which are spatially aligned in a central region of each image.

16. The device of claim 15, further comprising at least one optical filter inserted in front of at least one camera of the N digital cameras and configured to independently modify light flux in at least one optical channel of the device.

17. A method for gathering image sets, the method comprising:
focusing N digital cameras, where N≥2, the N digital cameras forming a system of digital cameras optically coupled via N−1 beam splitters, the N digital cameras comprising one or more ground truth cameras for capturing high quality ground truth images, and one or more target cameras for capturing low quality target images;
adjusting the system of digital cameras using a selected algorithm to align images in a central region;
using the N digital cameras, forming optical images with a same scene aligned in the central region of each image; and
obtaining a captured set of N images from the system of digital cameras synchronized by capture start time with different capture parameters.

18. The method of claim 17, wherein synchronization parameters are set such that at least one camera from the N cameras has a long exposure time, and remaining cameras from the N cameras other than the at least one camera have a short exposure time, a beginning of the short exposure time being shifted relative to a beginning of the long exposure time.

19. The method of claim 18, further comprising:
preliminarily registering a calibration set of images of a calibration color target;
based on the images in the calibration set, calculating a color correction matrix to enable matching colors of each image in the calibration set to colors of one image in the set; and based on the calculated color correction matrix, performing color correction of each image in the calibration set other than the one image.

20. The method of claim 19, further comprising:

calculating coefficients of polynomial transformations to match spatial coordinates of the ground truth images in the captured set to spatial coordinates of the target images; and applying the polynomial transformations to the ground truth images in the captured set, to thereby spatially align the ground truth images to the target images.

* * * * *